US012238120B1

(12) United States Patent
Werth et al.

(10) Patent No.: US 12,238,120 B1
(45) Date of Patent: Feb. 25, 2025

(54) EMBEDDED INTRUSION PREVENTION SYSTEM FOR INDUSTRIAL CONTROLLERS

(71) Applicant: Board of Trustees of the University of Alabama, for and on behalf of the University of Alabama in Huntsville, Huntsville, AL (US)

(72) Inventors: Aaron W. Werth, New Market, AL (US); Thomas H. Morris, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 219 days.

(21) Appl. No.: 17/548,115

(22) Filed: Dec. 10, 2021

Related U.S. Application Data

(60) Provisional application No. 63/123,831, filed on Dec. 10, 2020.

(51) Int. Cl.
*H04L 9/40* (2022.01)
(52) U.S. Cl.
CPC ............... *H04L 63/1416* (2013.01)
(58) Field of Classification Search
CPC . H04L 63/1416; H04L 63/083; H04L 63/101; H04L 63/0272; H04L 63/0428; G06F 21/6218; G06F 21/45
See application file for complete search history.

(56) References Cited

U.S. PATENT DOCUMENTS

| 9,660,994 | B2 | 5/2017 | McQuillan et al. |
| 9,967,274 | B2 | 5/2018 | Corrales et al. |
| 10,027,699 | B2 * | 7/2018 | Wei ................ G06F 21/552 |
| 11,178,176 | B2 | 11/2021 | McCann et al. |
| 2021/0048796 | A1 | 2/2021 | Rieger et al. |
| 2021/0099423 | A1 | 4/2021 | Flaus |
| 2021/0351980 | A1 * | 11/2021 | Huffman ............. H04L 63/1416 |
| 2021/0382989 | A1 | 12/2021 | Wei et al. |

(Continued)

OTHER PUBLICATIONS

Cromik, et al., "Improving SCADA Security of a Local Process with a Power Grid Model," ICS & SCADA Cyber Security Research, 2016, pp. 114-123.

(Continued)

*Primary Examiner* — El Hadji M Sall
(74) *Attorney, Agent, or Firm* — Butler Snow LLP; Jon E. Holland

(57) ABSTRACT

An intrusion prevention system can be embedded in an industrial controller to detect possible attacks on the corresponding physical system of the industrial controller. The intrusion prevention system can analyze the payload of network packets received at the industrial controller and predict what harm the payload of the network packet could cause to the physical system if executed by the industrial controller. To predict how the payload of a network packet may affect the physical system, the intrusion prevention system can perform a simulation with the payload of the network packet. The simulation can incorporate a model of the physical system, a copy of the logic used by the industrial controller and information relating to the current state of the system. The result of the simulation can be new predicted states for the physical system that can be evaluated to determine if a safety violation has occurred.

20 Claims, 9 Drawing Sheets

(56) References Cited

U.S. PATENT DOCUMENTS

2022/0046033 A1    2/2022  Tang
2023/0079418 A1*  3/2023  Hamilton ............ H04L 63/1408
                                                    726/22

OTHER PUBLICATIONS

Lin, et al., "Runtime Semantic Security Analysis to Detect and Mitigate Control-Related Attacks in Power Grids," IEEE Transactions on Smart Grid, Jan. 2018, pp. 163-178, vol. 9, No. 1.
Alves, et al., "Embedding Encryption and Machine Learning Intrusion Prevention Systems on Programmable Logic Controllers," Apr. 2018, pp. 1-6.
Das, et al., "On the Edge Realtime Intrusion Prevention System for DoS Attack," Proceddings of ICS & SCADA, 2018, pp. 84-91.
Werth, "A Specification-Based Intrusion Prevention System for Malicious Payloads," NCS, 2019, pp. 153-168.
Alves, et al., "Virtualization of Industrial Control System Testbeds for Cybersecurity," Computer Security 77, 2018, pp. 531-546.
Das, et al., "Modeling a Midstream Oil Terminal for Cyber Security Risk Evaluation," Critical Infrastructure Protection, 2018, pp. 149-175.
Griffith, "Using Modeled Cyber-Physical Systems for Independent Review of Intrusion Detection Systems," NCS, 2019, pp. 116-125.
Alves, et al., "OpenPLC: An IEC 61131-3 Compliant Open Source Industrial Controller for Cyber Security Research," Computer Security 78, 2018, pp. 364-379.
Das, et al., U.S. Appl. No. 17/548,109 entitled, "Embedded Intrusion Detection System for Industrial Controllers," filed Dec. 10, 2021.

* cited by examiner

EMBEDDED INTRUSION PREVENTION SYSTEM FOR INDUSTRIAL CONTROLLERS

CROSS-REFERENCE TO RELATED APPLICATIONS

This application claims the benefit of U.S. Provisional Patent Application No. 63/123,831, entitled "EMBEDDED PROCESS PREDICTION INTRUSION PREVENTION SYSTEM FOR INDUSTRIAL CONTROL SYSTEMS" and filed on Dec. 10, 2020, which application is incorporated herein by reference.

STATEMENT REGARDING FEDERALLY SPONSORED RESEARCH OR DEVELOPMENT

This invention was made with Government support under contract DGE1431484 by the National Science Foundation. The Government has certain rights in the invention.

BACKGROUND

The present application generally relates to an intrusion prevention system that can be embedded into an industrial controller, such as programmable logic controller (PLC), for an industrial control system.

Industrial control systems can be used to monitor and control the physical systems and processes associated with many critical infrastructures such as power generation and/or distribution, oil and gas production and/or distribution, water distribution and/or waste-water treatment systems, communication systems, building management systems and transportation systems. A typical industrial control system can use many "edge" industrial controllers that directly interface with the components of the physical system used for monitoring and controlling the process variables. The edge controllers can then communicate with a "main" computer having a user interface that permits an operator to monitor and control the entire physical system and corresponding processes via interactions with individual edge controllers.

Due to the importance of these critical infrastructures, a critical infrastructure may be the subject of a cyberattack attempting to cause harm by damaging, disabling or disrupting the critical infrastructure for political or monetary gain. To defend against cyberattacks, the corresponding industrial control systems can have intrusion detection systems that detect when an attack is happening and take steps to mitigate against the attack. The intrusion detection system is typically located in the main computer because the edge controllers do not typically include any security features and are dependent on the main computer to provide protections against a cyberattack. However, if the intrusion detection system of the main computer is ineffective and the main computer is compromised, then the attacker can have access to any of the edge controllers (and their corresponding connected components) to implement an attack on the physical system and processes and cause harm to the environment of the physical system. Thus, it would be beneficial to have an intrusion prevention system in the edge controllers as a last line of defense against cyberattacks on physical systems and processes.

BRIEF DESCRIPTION OF THE DRAWINGS

Wherever possible, the same reference numbers are used throughout the drawings to refer to the same or like parts.

DETAILED DESCRIPTION

Figure 1:
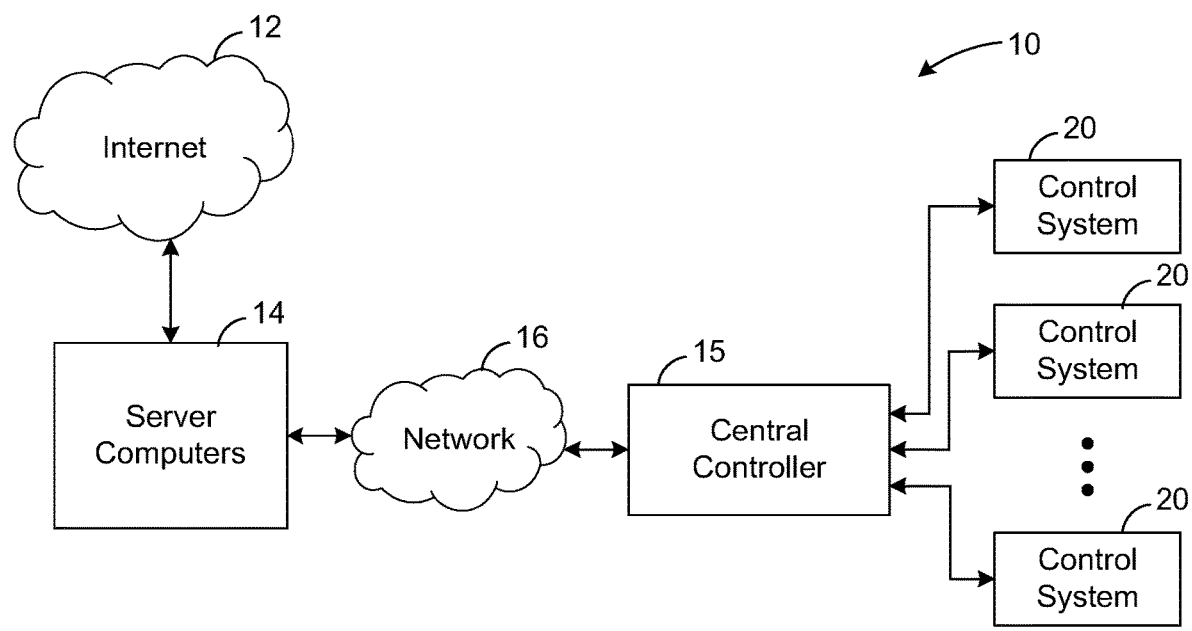
FIG. 1 is a block diagram showing an embodiment of an industrial network.

The present application generally pertains to an intrusion prevention system (IPS) that can be embedded in an industrial controller (such as a programmable logic controller (PLC)) of an industrial control system. The IPS can analyze the payload of packets sent to the industrial controller to detect possible attacks on the physical system associated with the industrial controller by predicting what harm the attacks could cause to the physical system and processes. The IPS can examine incoming packets and programs that are destined for the industrial controller that interacts with the physical system and processes. If the IPS predicts that the incoming packets or programs are harmful to the physical system and processes, then the IPS can potentially prevent or limit harm to the physical system and process by preventing the incoming packet from being executed by the industrial controller.

The IPS includes a module that examines any incoming packets that would alter settings or actuators and incorporates a model of the physical system and processes to assist in predicting what the possible effect of processing the command would be on the physical system and processes. Specifically, IPS can determine whether a safety violation would occur for critical variables in the physical system based on the predictions. The IPS can perform a simulation of both the physical system (with a physical system model) and the control process (e.g., ladder logic) actually executed by the industrial controller (with a modified version of the control process) to predict how the physical system and processes would respond to particular inputs. Similarly, uploaded programs that are sent to the industrial controller to make changes to the control process of the industrial controller can also be evaluated to determine whether the programs would cause a safety violation if implemented.

The IPS resides inside the industrial controller as a proxy process between the actual control process of the industrial controller and the network connecting the industrial controller to the remote monitoring and control system. By placing the IPS within the industrial controller, the IPS can serve as the innermost layer of defense against cyberattacks. Additional defenses against cyberattacks can be located on outer layers of the industrial control system and may include mitigations such as encryption and firewalls.

In another embodiment, an intrusion prevention system can be embedded into an industrial controller of an industrial control system such that the industrial controller can execute the intrusion prevention system. The intrusion prevention system can use a model of the physical process being controlled by the industrial controller and a "model" of the control logic executed by the industrial controller to predict the outcome of a network borne command (e.g., a command received by the industrial controller) before permitting the received command to be executed by the industrial controller. The model of the physical process in the intrusion prevention system used to simulate the physical process inside the industrial controller can be a trained auto regressive moving average (or an auto regressive exogenous) model. The model of the control logic can be a modified version of the actual control logic of the industrial controller to simulate state changes to components of the physical system resulting from the application of command and physical process changes to the actual control logic. The model of the control logic can be executed at high speed to rapidly simulate impact of the command being evaluated. In addition, the model of the physical process and the model of the actual control logic of the industrial controller can be used to detect time and logic bombs in new control logic uploaded to the industrial controller before permitting the new control logic to be executed by the industrial controller.

FIG. 1 shows an embodiment of an industrial network 10. As shown by FIG. 1, the industrial network 10 includes a central controller 15 that can be used to control multiple industrial control systems 20. In an embodiment, one or more of the industrial control systems 20 can be supervisory control and data acquisition (SCADA) systems that can be used to control industrial processes. The central controller 15 can be connected to one or more server computers 14 by a network 16 to facilitate communications between the server computers 14 and the central controller 15. In an embodiment, the network 16 can be a local area network (LAN) or a wide area network (WAN).

The server computers 14 can be connected to the Internet 12 to permit the industrial network 10 to communicate with other networks via the Internet 12. In an embodiment, the server computers 14 can include servers for corporate communications and business systems, email servers, domain name system (DNS) servers, and any other server needed by the industrial network 10. In addition, the server computers 14 may be isolated from the Internet 12 and the network 16 by demilitarized zones (DMZs). A DMZ (also referred to as a perimeter network) can be a physical sub-network that acts as a mediatory network architecture for connecting devices to prevent the devices from being exposed to a larger and untrusted network. Each DMZ can include a firewall having three or more interfaces, rather than the typical public and private interface.

The central controller 15 can be used to monitor and record field data from the control systems 20. Some examples of central controllers 15 include centralized monitoring systems, historians and data acquisition servers. Each control system 20 can include field devices, field controllers and nodes capable of monitoring and controlling the field devices (via the field controllers) using a human-machine interface (HMI). The HMI nodes can be considered to be "trusted" nodes because the signals and commands from these nodes to the field controllers and field devices are considered legitimate by the field controllers and field devices. An operator can query or send commands to the field controllers with the HMI node to gain visibility or to change process settings across the field devices. The field controllers (e.g., programmable logic controllers (PLCs)) can sample and process analog and digital data from the field devices and can use the processed data for internal decision making using pre-programmed, user-defined logic. The field devices can be edge devices that communicate the state of the physical processes (controlled by the control system 20) to the field controller and can be edge devices that are used to change the state of the physical process. For simplicity of illustration, FIG. 1 depicts three control systems 20 and one central controller 15, but there can be any number of control systems 20 or central controllers 15 in other embodiments.

Figure 2:
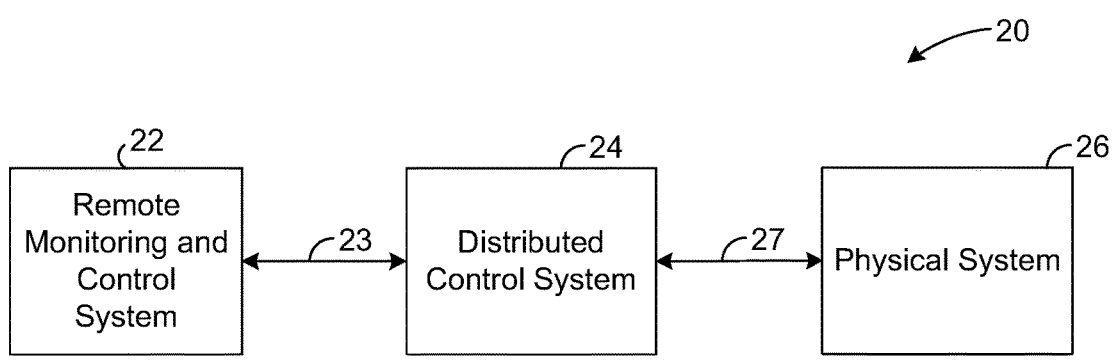
FIG. 2 is a block diagram showing an embodiment of the industrial control system from the industrial network of FIG. 1.
Figure 3:
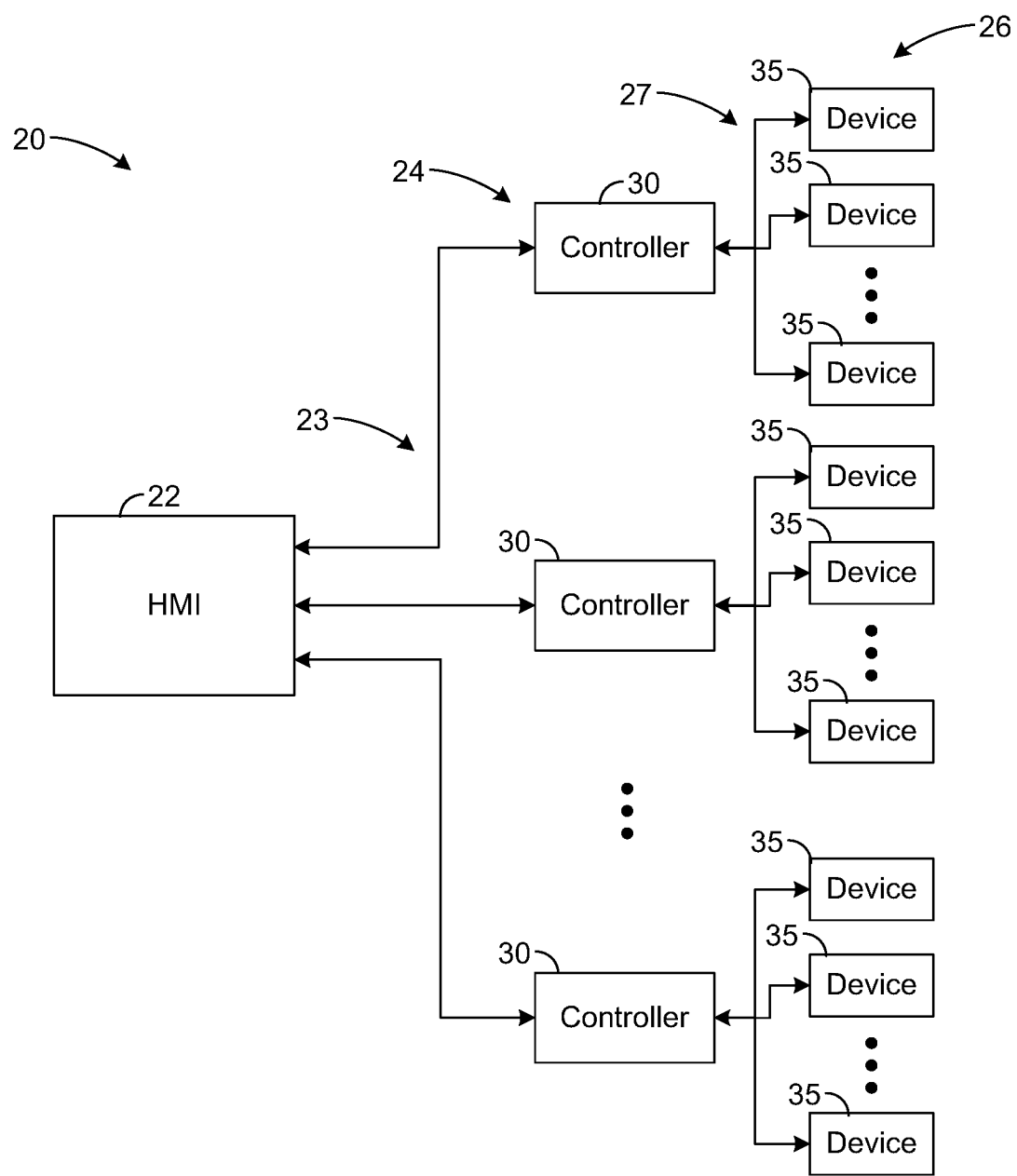
FIG. 3 is a block diagram showing an embodiment of the specific components of the industrial control system of FIG. 2.

FIGS. 2 and 3 show embodiments of the control system 20. In one embodiment, the control system 20 can include a remote monitoring and control system 22 that is connected to a distributed control system 24 by a network 23. The distributed control system 24 can be connected to the physical system 26 by a cyber-physical link 27. In an embodiment, the remote monitoring and control system 22 can include a human-machine interface (HMI) as shown in FIG. 3 and the network 23 can utilize a suitable SCADA protocol for communications. The distributed control system 24 can include multiple controllers 30 (see FIG. 3), which can be programmable logic controllers (PLCs) in one embodiment. The distributed control system 24 can be connected to multiple devices 35 (see FIG. 3) in the physical system 26. For simplicity of illustration, FIG. 3 depicts one HMI 22, three controllers 30 and nine devices 35, but there can be any number of HMIs 22, controllers 30 or devices 35 in other embodiments.

The remote monitoring and control system 22 can include HMIs, historians, data loggers and user management systems (e.g., Active Directory, RADIUS, etc.) that manage the physical process data and provide the interface for user interaction and control. The HMI 22 can be a front-end interface by which operators can interact with the monitored variables of the control system 20. The HMI 22 can include a display (or screen) that presents a graphical user interface to the operator. The graphical user interface can provide one or more buttons, alarms, reports or trends that can be used for monitoring, analyzing and controlling the processes of the control system 20. In an embodiment, the HMI 22 can be located locally in a process (or control) panel that is connected to and in proximity to the controllers 30. However, in other embodiments, the HMI 22 can be executed on computers in a control room located remotely from a process or control panel connected to the controllers 30. The HMI 22 can use the corresponding network protocol of network 23 (e.g., a SCADA network protocol) to communicate with the controllers 30 of the distributed control system 24 to gather information about the process variables and display them on the screen. In addition, the HMI 22 can use the corresponding network protocol of network 23 to send control actions and other types of messages to the devices 35 (see FIG. 3) via the controllers 30. For example, in the Modbus network protocol, the communication is defined in a master-slave scheme and the Modbus network protocol provides four different object types that include: coils (e.g., single-bit physical output); discrete inputs (e.g., single-bit physical input); input register (e.g., analog input readings); and holding register (e.g., analog output values or memory).

The network 23 can be implemented in one or more communication mediums such as telephone communications, Ethernet, radio communications and/or satellite communications. In an embodiment, the network 23 can use the Modbus protocol for communications between the controllers 30 and the HMI 22 (or other nodes of the remote monitoring and control system 22). In other embodiments, the network 23 may use different protocols for communications such as PROFIBUS, WorldFIP, ControlNet, EtherNet/IP, DNP3, and/or A-B DF1. In still other embodiments, the network 23 may use multiple protocols over different communication mediums resulting in the need for a protocol gateway to provide a mechanism for enabling devices communicating on different protocols to talk to each other. Additionally, the network 23 may also have supplementary devices such as bridges, routers and switches, to control the network traffic, and may be physically separated (e.g., with air gap) or logically separated (e.g., with a virtual LAN or data diodes) from other networks in the control system 20.

The distributed control system 24 can include one or more controllers (or edge controllers) 30 that can directly interface with the devices 35 (e.g., sensors and actuators) of the physical system 26 through the cyber-physical link 27 as shown in FIG. 3. The controllers 30 can be field units that have embedded control capabilities in order to accomplish some logic operations. In an embodiment, the controllers 30 can be programmable logic controllers (PLCs). The controllers 30 can be responsible for collecting signals from some of the devices (e.g., sensors) 35 through the cyber-physical link 27, processing the received signals from the sensors according to pre-defined programming, and then sending response signals to other devices (e.g., actuators) 35, also through the cyber-physical link 27.

In an embodiment, the controller 30 can utilize either discrete signals or analog signals. Discrete signals are signals that assume one of two possible states (e.g., either on or off or 1 or 0). Analog signals can take on a range of values, and can represent a time varying quantity such as temperature, pressure, density, etc. Discrete signals require only one bit to be stored in memory and are fast to read and write. In contrast, analog signals require more bits to be stored in memory (where the number of bits will depend on the hardware used to read the signal) and can be slower to read and write when compared to discrete signals. The controller 30 can use two types of hardware for processing analog signals: an analog-to-digital converter (ADC) for signal reading and a digital-to-analog converter (DAC) for signal writing. The ADC converts the analog quantity into an integer number, while the DAC converts an integer number into an analog quantity.

The cyber-physical link 27 provides a transport medium for signals to be communicated between the physical system 26 and the distributed control system 24. In an embodiment, the cyber-physical link 27 can utilize one or more of Fieldbus, Highway Addressable Remote Transducer (HART), WirelessHART and/or Zigbee to communicate signals and information between the physical system 26 and the distributed control system 24. Fieldbus is an industrial network system used to connect instruments in a manufacturing plant to industrial controllers. HART is a hybrid analog-digital industrial automation protocol that can send digital messages overlaid on the legacy 4-20 mA analog instrumentation current loops. WirelessHART is a time synchronized, self-organizing, and self-healing mesh network architecture, developed as a multi-vendor interoperable wireless standard for sensor networks. Zigbee is a low-power wireless mesh network standard targeting long battery life devices in wireless control and monitoring applications. In other embodiments, the cyber-physical link 27 may just incorporate plain electrical wires that directly transport voltage or current signals.

The physical system 26 can have devices 35 used to implement one or more physical processes associated with power generation, oil/gas production, water/waste-water treatment, wind farms, large communication systems, building management systems and/or transportation systems. The devices 35 (e.g., sensors and/or actuators) can be used to monitor and control process variables associated with the physical processes. A sensor can be a device that measures a physical quantity (e.g., pressure, temperature, flow, density, etc.) and converts the measurement into an electric signal which can be read by an observer (via the HMI 22) or by an instrument. An actuator can be a component of a machine in the physical system 26 that is responsible for moving or controlling a mechanism in the physical system 26 in response to an input control signal from the distributed control system 24. In an embodiment, the actuator can be the mechanism by which the control system 20 can control the physical process and act upon the corresponding environment.

Figure 4:
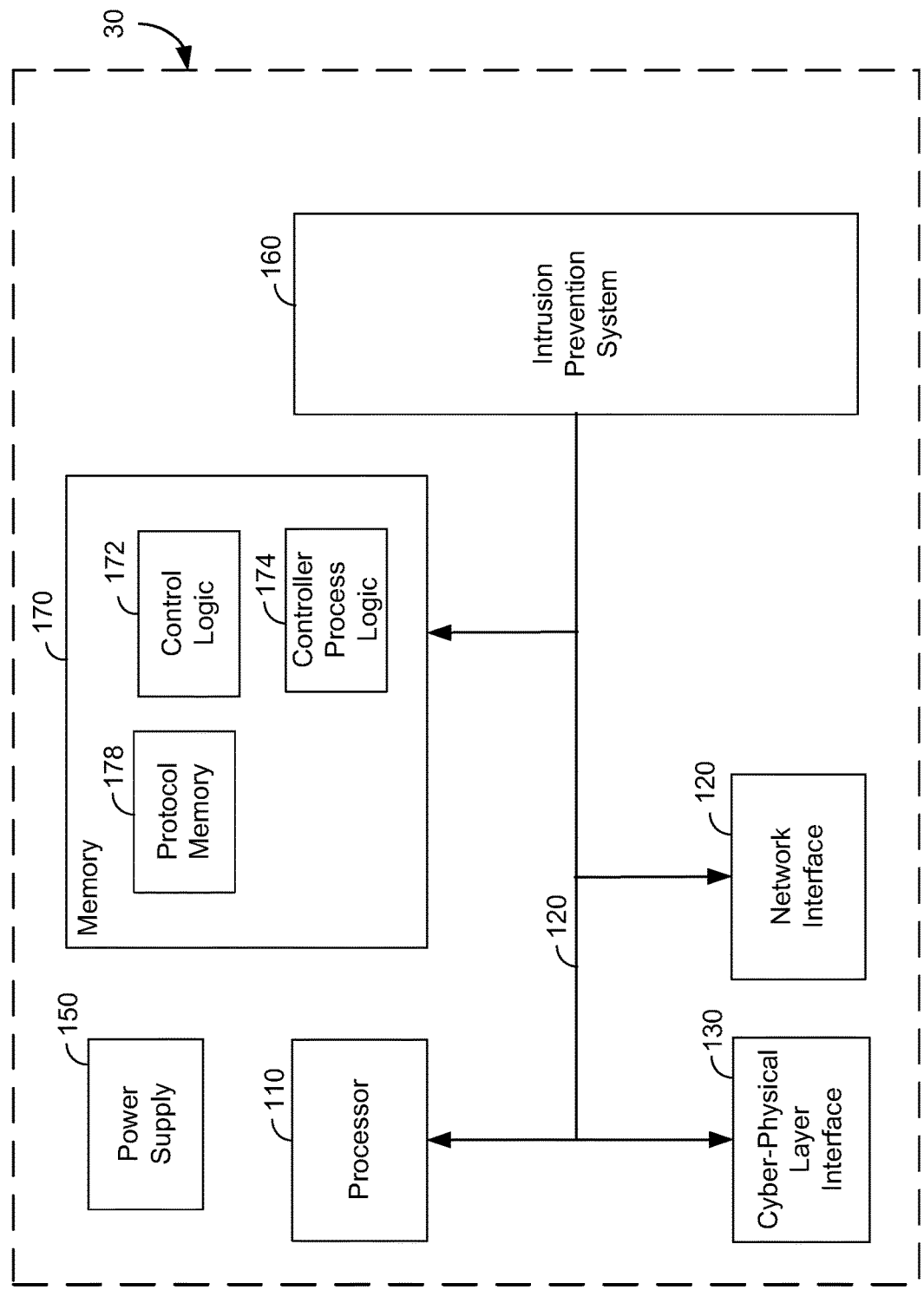
FIG. 4 is a block diagram of an embodiment of the industrial controller of FIG. 3.

FIG. 4 shows an embodiment of the controller 30. The controller 30 shown by FIG. 4 can include logic 172, referred to herein as "control logic," for generally controlling the operation of the controller 30. The controller 30 also includes logic 174, referred to herein as "controller process logic" for receiving and processing information received from devices 35 (e.g., sensors) and generating instructions or commands (based on the received information) for the devices 35 (e.g., actuators). The information received by the controller process logic 174 from the connected devices 35 can be stored in protocol memory 178, which can include one or more registers or coils for storing data from the devices 35. In other embodiments, the controller process logic 174 can be combined with the control logic 172. The controller 30 can also include an intrusion prevention system 160 that monitors incoming packets to the controller 30 and determines if the payload of the packet (when executed by the controller process logic 174) results in an "unsafe" condition for the physical system and/or physical process associated with the controller 30. The control logic 172, the controller process logic 174 and the intrusion prevention system 160 may be implemented in software, firmware, hardware, or any combination thereof. In FIG. 4, control logic 172, the controller process logic 174 and the intrusion prevention system 160 are implemented in software. The control logic 172 and the controller process logic 174 may be stored in memory 170. However, other configurations of the control logic 172, the controller process logic 174 and the intrusion prevention system 160 are possible in other embodiments. In addition, while the intrusion prevention system 160 is shown as a separate component in FIG. 4, the intrusion prevention system 160 may be stored in memory 170 in other embodiments.

Note that the control logic 172, the controller process logic 174 and the intrusion prevention system 160, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The controller 30 may include at least one conventional processor 110, which includes processing hardware for executing instructions stored in the memory 170. As an example, the processor 110 may include a central processing unit (CPU) or a digital signal processor (DSP). The processor 110 communicates to and drives the other elements within the controller 30 via a local interface 120, which can include at least one bus. When the control logic 172, the controller process logic 174 and the intrusion prevention system 160 are implemented in software, the processor 110 may execute instructions of the control logic 172, the controller process logic 174 and the intrusion prevention system 160 to perform the functions ascribed herein to the control logic 172, the controller process logic 174 and the intrusion prevention system 160.

The controller 30 can have numerous ports (not specifically shown) that can provide connections to communication interfaces for the controller 30 to communicate with other components of the control system 20. As shown in FIG. 4, the controller 30 can include a network interface 120 and a cyber-physical layer interface 130. While the network interface 120 and the cyber-physical layer interface 130 are shown as separate interfaces in FIG. 4, the interfaces may be combined into a single interface in other embodiments. The network interface 120 enables the controller 30 to communicate with the HMIs 22 and other nodes of the remote monitoring and control system. The cyber-physical layer interface 130 enables the controller 30 to communicate with the devices 35. In an embodiment, the network interface 120 and the cyber-physical layer interface 130 may use separate IP ranges to permit the controller 30 to isolate each communication link provided by an interface. Each of the network interface 120 and a cyber-physical layer interface 130 may include a radio or other device for communicating wirelessly and/or corresponding equipment for wired communications. The controller 30 can also have a power supply 150, which provides electrical power to the components of the controller 30 and possibly, in an embodiment, to devices 35 via the cyber-physical layer interface 130. In one embodiment, the power supply 150 has an interface that allows it to plug into or otherwise interface with an external component, such as a wall outlet or battery, and receive electrical power from such external component. If desired, the power supply 150 may incorporate one or more batteries to permit the controller 30 to be independent of the external power component.

Figure 5:
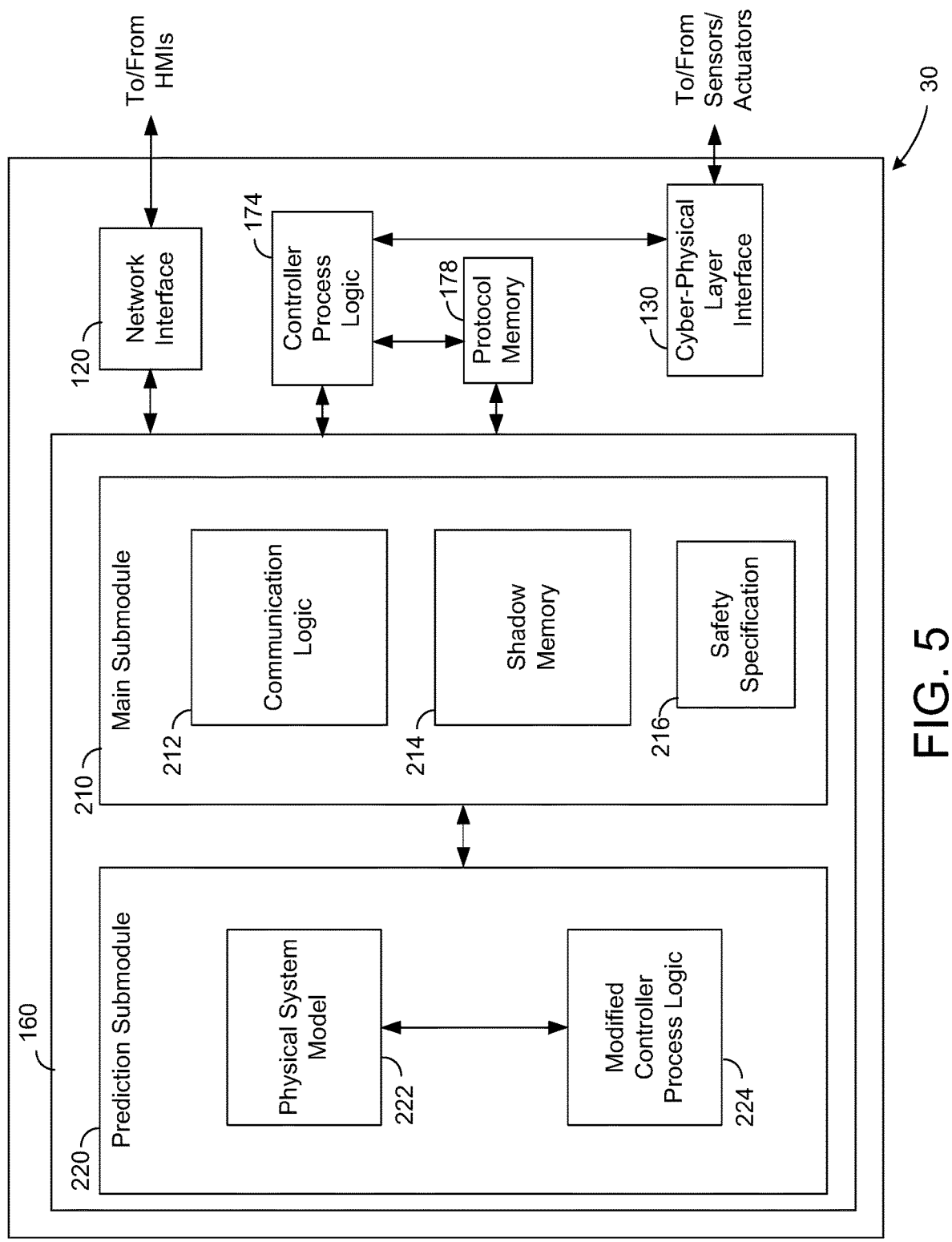
FIG. 5 is a block diagram of an embodiment of the intrusion prevention system of FIG. 4.

FIG. 5 shows an embodiment of the intrusion prevention system 160 within the controller 30. The intrusion prevention system 160 can be a software-based module that executes inside the controller 30 as a stand-alone process. The intrusion prevention system 160 can act as a proxy between the controller process logic 174 and the HMI 22 (and other trusted nodes) communicating over network 23 by intercepting all network traffic between the controller 30 and the HMI 22 at the network interface 120 and relaying all communication between the two. The intrusion prevention system 160 can receive all of the network packets for the controller 30 (from the HMI 22 and other trusted nodes), evaluate the packets and relay the "safe" packets to the control logic 172 and/or the controller process logic 174 for subsequent action by the controller 30. The intrusion prevention system 160 can have two submodules: a main submodule 210; and a prediction submodule 220.

The main submodule 210 can include communication logic 212, a shadow memory 214 and a safety specification 216. The communication logic 212 can be used to receive network packets sent from the HMI 22 (and other trusted nodes) to the controller 30 and prevent the network packets from being received by the control logic 172 and the controller process logic 178. In an embodiment, the intrusion prevention system 160 can reassign the ports in the network interface 120 used by the control logic 172 and/or the controller process logic 174 such that the intrusion prevention system 160 receives all the packets (or communications) for the controller 30 instead of the control logic 172 and/or the controller process logic 174. Once the reassignment of the port used by the control logic 172 and/or the controller process logic 174 is completed, the intrusion prevention system 160 can monitor the predefined port designated by the network protocol for network 23 for network packets. As network packets are received at the network interface 120, the intrusion prevention system 160 provides the packets to the communication logic 212. The communication logic 212 can then evaluate the network packet and take subsequent action as described below.

If the communication logic 212 determines that one of the network packets is a command packet, the command packet is further evaluated before the packet is sent to the controller process logic 174 of the controller 30. The shadow memory 214 can stores a local copy of memory 170 (particularly protocol memory 178) of the controller. In an embodiment, the contents of the shadow memory 214 can be obtained by examining the contents of read and write queries and responses that pass through intrusion prevention system 160. In another embodiment, the shadow memory 214 may directly query memory 170 and/or protocol memory 178 to obtain the appropriate information.

When the communication logic 212 detects a packet that includes a command to change a setting or state of the physical system associated with the controller (e.g., a command packet), the communication logic 212 forwards the command and the current settings or states of the physical system stored in the shadow memory 214, including the settings or states affected by the command, to the prediction submodule 220. The prediction submodule 220 can include a physical system module 222 and modified controller process logic 224. The prediction submodule 220 then predicts the effect of the command and returns the prediction result to the main module 210. The communication logic 212 of the main submodule 210 can use the prediction result from the prediction submodule 220 to evaluate the command and determine if the command should be forwarded to the controller process logic 174 or if other actions should be taken with regard to the packet/command (e.g., dropping the packet).

The communication logic 212 of the main submodule 210 can relay request packets (i.e., packets requesting information and not attempting to change a setting or state) or command packets that have been determined to be "safe" by the communication logic 212 to the controller 30. The communication logic 212 also receives the resulting response packets from the controller process logic 174 and stores the packets' data (i.e., the data requested by the HMI 22) in the shadow memory 214. The communication logic 212 observes both the request packets (from the HMI 22), which contain memory addresses, and the response packets (from the controller process logic 174), which contains the data stored at those addresses. Using the information from the request and response packets, the communication logic 212 can duplicate the registers and coils of the protocol memory 178 (which is used by controller process logic 174 in the monitoring and controlling of the physical system associated with the controller 30) in the shadow memory 214 for analysis and situational awareness.

In an embodiment, the shadow memory 214 can store the information from the protocol memory 178 as lists of tuples in a dictionary. The tuples can include the memory address of a register, the register's contents, and a timestamp. The shadow memory 214 can store the most current sensor data observed from queries received from the HMI 22. The shadow memory 214 can perform two functions for the intrusion prevention system 160: the shadow memory can store the current state(s) of the physical system (and processes) associated with the controller 30 and provide the state information to the prediction submodule 220; and (2) the shadow memory can log time-series data for training purposes (e.g., for training the physical system model 222).

The shadow memory 214 has two modes of operation: passive; and active. In the passive mode, the communication logic 212 observes communications between the HMI 22 and the controller 30 to reconstruct registers and their contents (e.g., inputs, outputs, holding registers and coils). In the active mode, the communication logic 212 directly sends request packets to the controller process logic 174 to obtain current values in registers of protocol memory 178. The active mode can be used when: the requests from the HMI 22 (i.e., HMI polling) are not frequent enough to accurately determine states of the registers; the HMI 22 does not request certain information, such as the contents of a specific register or coil in protocol memory 178; and the HMI 22 is compromised and not behaving correctly (e.g., the HMI 22 is the victim of a cyberattack). The timestamp included in the shadow memory 214 cam be a useful indicator of the "freshness" of the data in the shadow memory 214. The information can be compared to the current time to determine whether it is appropriate for the communication logic 212 to request current information from the protocol memory regarding the state of the physical system (and processes) associated with the controller 30.

The prediction submodule 220 can include the modified controller process logic 224, which is logic (or a process) configured to represent the controller process logic 174 that is actually controlling the physical system (and processes) associated with the controller 30. In an embodiment, the modified controller process logic 224 can be used to test hypothetical scenarios of what would occur in the controller process logic 174, if the controller process logic 174 processed a packet received by the communication logic 212. The modified controller process logic 224 is similar to the controller process logic 174 in that the modified controller process logic 224 can operate by performing scan cycles over many iterations.

Figure 6:
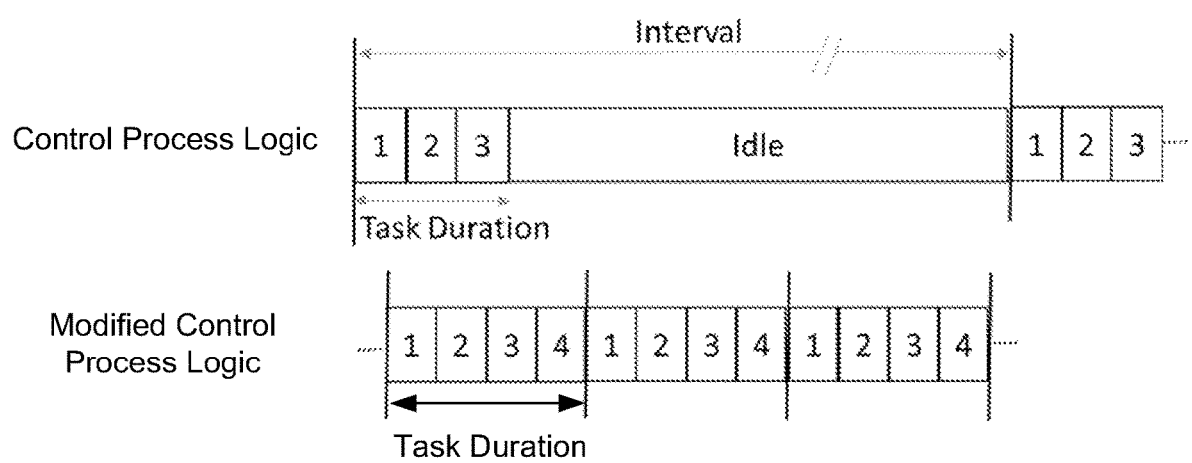
FIG. 6 shows an embodiment of graphs comparing task durations.

One difference between the modified controller process logic 224 and the controller process logic 174 is that the modified controller process logic 224 does not have an added delay between scan cycles (i.e., the next scan cycle is immediately executed). On the other hand, in the controller process logic 174 controlling the physical system (and processes) of the controller 30, the main task of the scan cycle occurs at regular fixed intervals of time defined by the controller process logic 174 because the controller 30 interacts with the physical system. As shown in FIG. 6, the main task embodying the interval (or scan cycle) performs three steps: (1) read inputs; (2) process iteration of controller process logic 174; and (3) write to outputs. The main task for the controller process logic 174 takes a very small amount of time compared with the interval (or scan cycle). Therefore, time remains in the interval in which the controller process logic 174 is idle. The modified controller process logic 224 also performs the same three steps described above for the controller process logic 174 and additionally executes a fourth step (4), which is to update the physical system model 222. As can be seen by the inclusion of step 4 in the task duration for the modified control process logic 224, the physical system model 222 can be simulated and "in sync" with the modified controller process logic 224 in terms of simulated timing such that that when the modified controller process logic 224 advances a given time step in the simulation (steps 1-3), the physical system model 222 also advances this time step (step 4). The modified controller process logic 224 (and physical system model 222) lacks any idle period so that several predictions can be made quickly over the span of a single scan cycle for the controller process logic 174. While the embodiment of FIG. 6 shows three tasks (or iterations) completed in the scan cycle for the controller process logic 174, it is to be understood that more (or less) than three tasks (or iterations) can be completed in the scan cycle for the controller process logic 174 in other embodiments. Since the modified controller process logic 224 can execute tasks more quickly than the controller process logic 174, the prediction submodule 220 is able to test hypothetical scenarios with a reduced latency period (i.e., the total time incurred by the modified controller process logic 224 (and the physical system model 222) to complete the scan cycles for the prediction) that does not adversely affect the ability of the controller 30 to process new commands.

In an embodiment, when a packet is sent to the controller 30 that includes a command (i.e., a command packet), the intrusion prevention system 160 uses the prediction submodule 220 to test the hypothetical scenario of implementing the command. Because the packet is a command packet, the packet has a function code indicating a write request, which indicates to the communication logic 212 that the packet needs further evaluation before being provided to the controller process logic 174. The communication logic 212 can forward the command to the prediction submodule 220 to predict the potential impact of the command on the physical system.

When performing an evaluation the prediction submodule 220 can perform certain steps. First, the physical system model 222 receives state variable information, such as any process variable (e.g., current water level) data from the shadow memory 214. The process variable data from the shadow memory 214 is important because the physical system model 222 should have initial conditions similar to the true physical process's current state in order to accurately model the physical system and process. Second, the command to be evaluated and the state variable information is applied to the modified controller process logic 224. Third, the prediction module 220 simulates the physical system model 222 combined with the modified controller process logic 224. Fourth, the communication logic 212 evaluates the results of the simulation to determine if any critical variables are outside of a preselected safe region as defined in the safety specification 216. Fifth, the communication logic 212 decides how to proceed depending on the potential impact of executing the command from the prediction submodule 220. If the command is determined to be safe according to the safety specification 216, the command is forwarded to the controller process logic 174 for subsequent action. Otherwise, the communication logic 212 can take other actions, such as blocking or delaying execution of the packet, to prevent or minimize the impact of the harmful command on the physical system and process.

There are two main phases for the operation of the intrusion prevention system 160: the training phase (Phase 1); and deployed phase (Phase 2). The training phase involves training the physical system model 222 to accurately represent the physical system. The training phase has three major steps: collection of data; parameter estimation for a trial set of physical system models 222; and validation and selection of the physical system model 222 to be used in the intrusion prevention system 160. In the deployed phase, the physical system model 222 can be used to predict if an action may cause the physical system to enter into an unsafe state. The second phase is the deployed operational phase in which the intrusion prevention system 160 is used in the controller 30. The deployed phase can include two main steps: monitoring; and incident response.

In the training phase, the collection step includes collecting "normal" input and output data (e.g., data not tampered with by a cyberattack) over time from the controllers 30. The data can be collected from register values in the protocol memory 178 of the controller 30. Not all the registers in protocol memory 178 may need to be collected, only those directly involved in the physical process, such as the process variable (PV) and the controlled variable (CV). The amount of data to be collected can depend on capturing the full range of behavior of the physical system or nearly the full range in terms of low and high values of the PV.

The input data can be defined as input into the physical systems or CV over time. The input data can also include actuator states. The input data may be binary in nature so that the value can be a 0 or 1. On the other hand, the input may be a range of values, if the actuator can be adjusted to a range of settings, positions, or levels to influence the physical system. The output data is defined as output from the physical system or the PV over time. The output data can include discrete-time data from the sensors in the physical system. The time-series data can be collected by sampling the sensor data at regular intervals. The acceptable sample rate depends on the response of the physical system. If the response of the system is relatively fast, then a higher sampling rate must be used. Otherwise, a lower sampling rate may be used. There are two main ways that data can be collected. One approach is to have the controller use the controller process logic 174 for normal operation of the physical system and process. As the controller 30 is running and controlling the physical system, the intrusion prevention system 160 can collect the sensor data. The actuator commands, which are applied to the physical system, are also recorded by the intrusion prevention system 160. The other approach would be to choose inputs to the physical system directly and experimentally observe the outputs of the physical system. For example, an actuator, such as a pump that is used for the physical system, can be activated. The response of the sensor data or output of the physical system can then be observed as the sensor data rises in value due to the stimulus of the actuator.

The parameter estimation step involves using the collected time-series data to train a set of trial mathematical models which are intended to represent the physical system (i.e., the physical system models 222). The time-series data can capture a wide range of the physical process's behavior to be useful for training. Training involves determining parameters for the trial physical system models 222. The parameters are part of the mathematical expression of the models and their values determine the behavior of the models. The behavior refers to how the model's state and output behave over time due to stimuli from the input. In an embodiment, the method of least square error can be used to calculate the parameters for the models, although other techniques can be used to calculate the parameters in other embodiments.

The least square error method can be an approach to system identification. System identification is the process of taking samples of inputs and output data from the physical system, which is treated as a black box, and generating models that represent the physical system's behavior. In an embodiment, an auto-regression/moving average (ARMA) model, also referred to as a linear auto-regressive with exogenous input (ARX) model, can be used because the model incorporates both inputs and outputs, not just simply the states or outputs of the physical system. The inputs can be the actuator signals that impact the model. Equation 1 can represent and embodiment of a single input and single output (SISO) ARMA model.

$$X[n]=a_1X[n-1]+a_2X[n-2]+ \ldots +b_0U[n]+b_1U_1[n-1]+ \ldots e \quad (1)$$

The ARMA model may also have multiple outputs $(X_1 \ldots X_k)$ and multiple inputs $(U_0 \ldots U_j)$ that affect the physical system. Equation 2 can represent the multiple input multiple output (MIMO) ARMA model for i from 1 to k.

$$X_i[n]=a_1X[n-1]+a_2X[n-2]+ \ldots +b_0U[n]+b_1U_1[n-1]+ \ldots e \quad (2)$$

The parameters (a1, a2 . . . , b1, b2 . . . ), which are coefficients in Equations 1 and 2, can be selected to enable the model to fit the observed data and the term e is the error term.

The validation step involves selecting the best structure of the physical system model 222. In this context, the structure is a mathematical relationship between the input and output terms in the form of the ARMA model. Each structure has unique numbers of input terms and output terms in the right-hand side of the equation for the ARMA model, as seen in Equation 1. In order to choose the correct structure for the physical system model 222, multiple structures are required to have been trained in step 2, starting with structures containing a low number of a and b terms to a higher number of a and b terms.

Then, other time-series data representing the physical system, different from the data that was used to train the models, can be applied to the trained trial models. This "other" data is the validation data, which includes input and output time-series data like the training data. In an embodiment, the validation data can capture a wide range of the physical process behavior that is different from the training data. The validation data may originate from a larger set of data that includes the training data. The validation data may also be derived from executing an independent set of experiments on the same physical system used to collect the training data. Whichever way the validation data is obtained, the input time-series portion of the validation data is applied to the trial models. The resulting output set of time-series data produced from applying the input validation data to the trial models may be compared to the output validation data to determine which trial model is the best fit.

In an embodiment, metrics can be used to determine how well a given trial ARMA model fits the behaviors of the actual physical system. In one embodiment, a normalized root mean squared error (NRMSE) can be used to compare the time series data for validation. However, in other embodiments, mean absolute percentage error (MAPE) and symmetric mean absolute percentage error (SMAPE) can also be used to compare time-series data for validation.

The purpose of the validation is to prevent underfitting or overfitting the data. Underfitting occurs when the model is not accurate enough to represent the physical system as indicated by the metric. Overfitting occurs when a given trained model structure seems to accurately represent a given set of data from the physical system, but the model is not general enough to represent other data from the physical system. In this case the model is overly complex and uses more parameters than is necessary to fit the data. When the model is validated with another set of data, the model structure has a low value for the NRMSE. When multiple structures are validated with the same data, the model that has the highest value according to NMRSE is least affected by overfitting. The step of validation determines the trial model that best avoids underfitting and overfitting and is representative of the physical system.

Once the training phase has generated the physical system model 222, the prediction submodule of the intrusion prevention system 160 can use the physical system model 222 in operation when the intrusion prevention system 160 is actually protecting a controller 30. The intrusion prevention system 160 can examine incoming packets and use the physical system model 222 to predict the impact of the packets' payloads. The deployed phase involves (1) monitoring and inspection of incoming packets and (2) responding to packets determined to cause safety violations, especially safety violations that are imminent.

The monitoring and evaluation of incoming packets step involves using the physical system model 222 (i.e., the selected and validated ARMA model) to evaluate incoming command packets and controller process logic uploads (i.e., changes and/or updates to the controller process logic 174). The evaluation involves simulating the scenario in which the command is processed. The goal of executing the scenario is to detect if the change by the command packet or controller process logic upload would be harmful to the physical system according to defined safety criteria, which are part of the safety specification 216.

When the controller 30 receives a command packet or the controller process logic upload, the communication logic 212 can provides the command packet or controller process logic upload to the prediction submodule 220. The prediction submodule uses the physical system model 222 (i.e., the trained ARMA model) to predict whether the command, when applied by the modified controller process logic 224 to the physical system model 222, would violate the safety conditions for the system. The modified controller process logic 224 interfaces with the inputs and outputs of the physical system model 222. In an embodiment, the physical system model 222 and the modified controller process logic 224 can be executed concurrently, or in other words, in step with each other. The physical system model 222 can be permitted to advance one modified controller process logic scan cycle period. Then, the modified controller process logic 224 can advance a scan cycle.

The safety specification 216 can include: the physical system model 222, which is an ARMA model with its various parameters; safety conditions for the process variable(s) controlled by the controller 30, which conditions have to be maintained by the controller 30; and conditions for imminent danger, which involves the timing of an arriving command's harmful impact. The safety condition can be described as an acceptable range with minimum ($PV_{min}$) and maximum ($PV_{max}$) values. The process variable must remain in that range to be considered safe ($PV_{min}<=PV<=PV_{max}$). The intrusion prevention system 160 makes a determination on whether the given program or command received at the controller 30 may cause the physical process to become unsafe within a given prediction window. The prediction window can be the set of scan cycles that are executed dynamically in the prediction submodule 220 to predict future behavior of the physical system. Another way to characterize safety is the idea of imminent danger in which a minimum time value is given in addition to the safety condition. In other words, there is imminent danger if the predicted unsafe event at the occurs before the minimum time ($t_{min}$): $PV>PV_{max}$ or $PV<PV_{min}$, where the $<t_{min}$. The minimum time can be defined in the safety specification 216 by a user.

In an embodiment, the possible actions that the intrusion prevention system 160 can take when responding to packets determined to cause a safety violation include the following: process the command packet or the controller process logic upload; drop the packet; and delay the processing of the command packet or the controller process logic upload. Delaying the packet means that the packet may not be processed for a given amount of time as defined in the safety specification 216. The delay in processing permits the user to decide whether to proceed with processing the packet. In addition, an alert can be provided to the user with any of the above-identified responses. The decision on how the intrusion prevention system 160 responds is a heuristic process based on the predicted severity of the cyberattacks. If a packet arrives at the controller 30 and the intrusion prevention system 160 determines the packet to have a benign effect on the physical system, meaning the resulting behavior of the physical system and process would be safe and not imminently dangerous, then the packet is processed. If the resulting behavior is predicted within the prediction window to eventually become unsafe, but does not cause imminent danger ($t_e>t_{min}$), then the packet can be processed with an alert to the user. However, if the packet is predicted to cause imminent danger ($t_e<=t_{min}$), then the packet is dropped or delayed as indicated by the safety specification 216.

Figure 7:
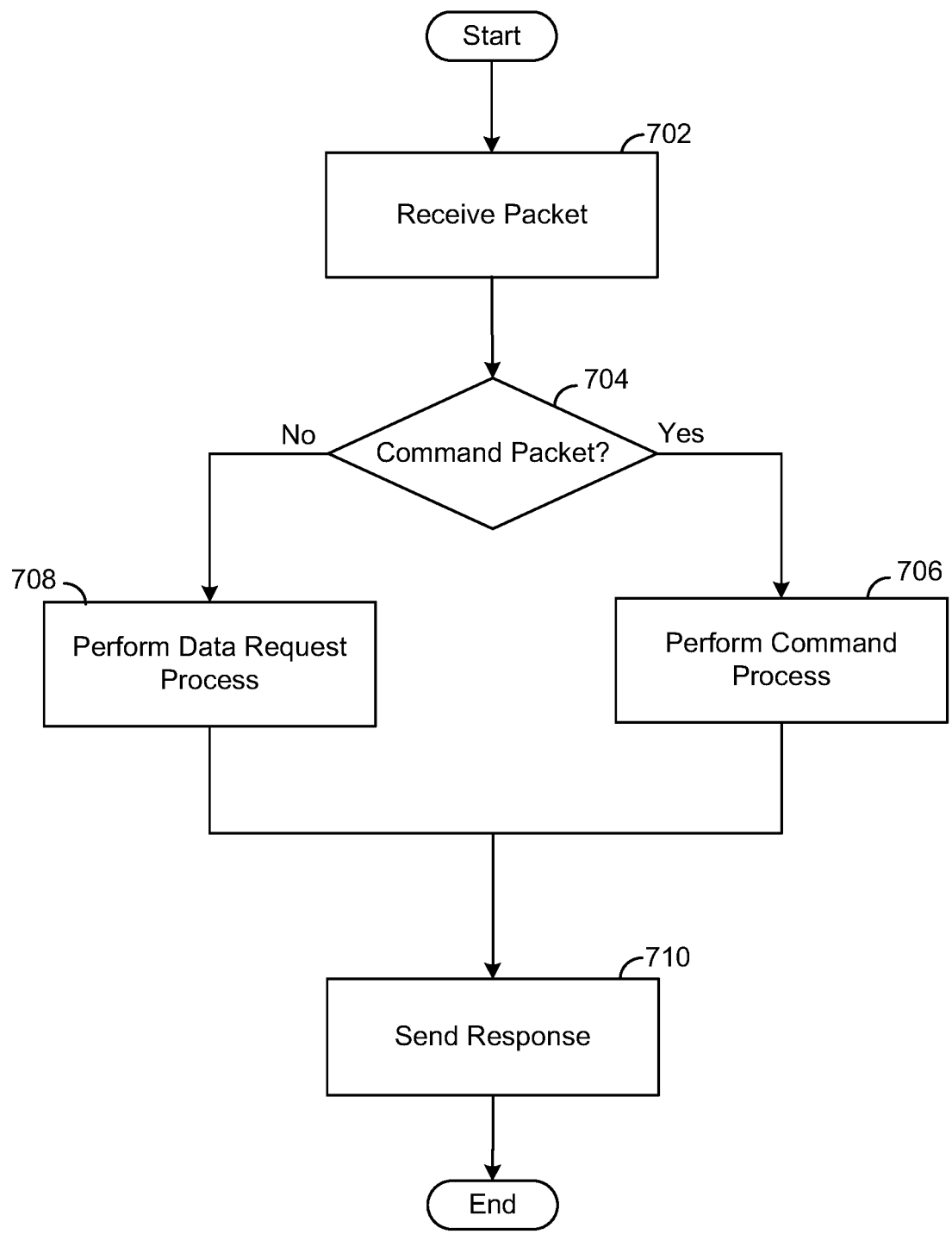
FIGS. 7-10 are flowcharts showing embodiments of processes executed by the intrusion prevention system.
Figure 8:
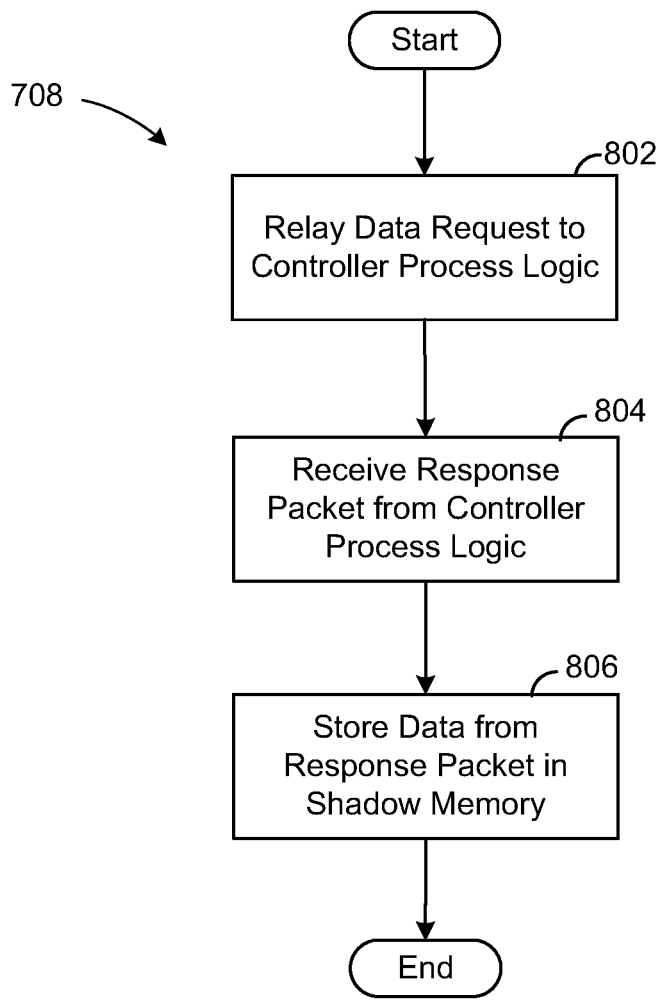
Figure 9:
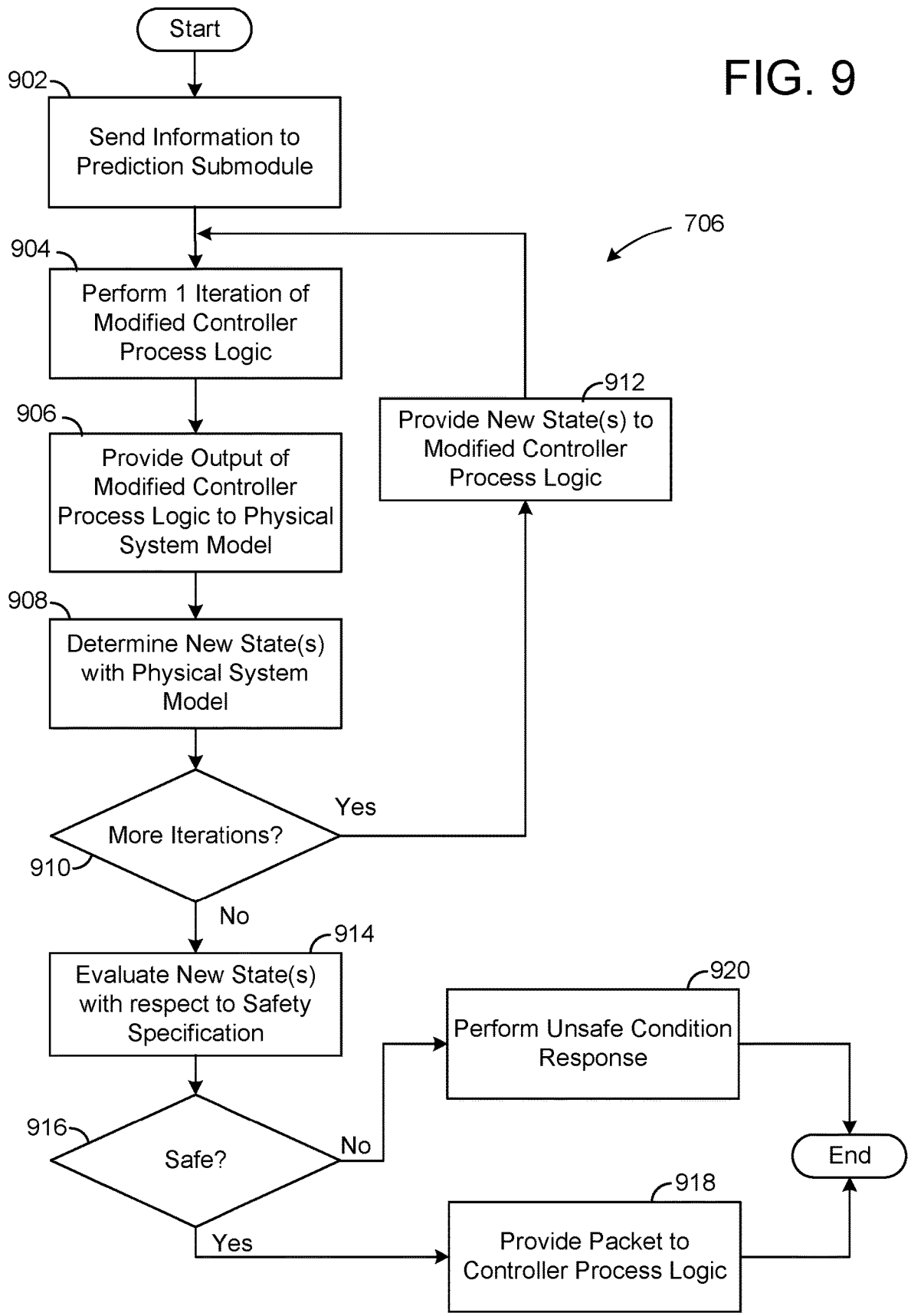

FIGS. 7-9 show flow charts for handling packets received at the controller 30. FIG. 7 shows an embodiment of the general process for handling packets received by the controller 30. FIG. 8 shows an embodiment of a process for handling a data request packet and FIG. 9 shows an embodiment of a process for handling a command packet. In FIG. 7, the process begins by the controller 30 receiving a packet from the HMI 22 (or other trusted node) via the network 23 and the network interface 120 (step 702). More specifically, the main submodule 210 of the intrusion prevention system 160 for the controller 30 receives all of the network packets sent to the controller 30.

Next, the communication logic 212 of the main submodule evaluates the received packet to determine if the packet is a command packet (step 704). A command packet can be a packet that has the potential of writing to a register or coil of the protocol memory 178 to change the state of an actuator or setting in the controller process logic 174 of the controller 30. The communication logic 212 can determine a packet is a command packet based on the function code included in the packet. If the received packet is not a command packet, then the packet can be a data request packet. The data request packet can be used to retrieve data from registers or coils in the protocol memory 178 of the controller 30. The HMI 22 can periodically send data request packets to the controller to enable the HMI 22 to know the current state of the controller 30.

If the communication logic 212 determines that a command packet has been received, the intrusion prevention system 160 performs a command process on the packet (step 706) that evaluates whether the command packet is "safe" for the controller 30 and associated physical system. In one embodiment, the command process performed in step 706 can be the process shown in FIG. 9. However, other processes used to evaluate whether a packet is "safe" can be used in other embodiments. After, the command process is completed, a response (if appropriate) can be sent to the HMI 22 (or other trusted node) that sent the packet (step 710) and the process ends. However, if a data request packet has been received, then the intrusion prevention system 160 performs a data request process on the packet (step 708) that retrieves the requested data from the protocol memory 178. In one embodiment, the data request process performed in step 708 can be the process shown in FIG. 8. However, other processes used to retrieve data can be used in other embodiments. After, the data request process is completed, a response packet with the requested data can be sent to the HMI 22 (or other trusted node) that sent the packet (step 710) and the process ends.

In FIG. 8, the data request process begins by the communication logic 212 relaying or forwarding the data request packet to the controller process logic 174 (step 802). Prior to relaying the data request packet to the controller process logic 174, the communication logic 212 can retrieve and store the address (of the requested data) from the data request packet. Once the controller process logic 174 receives the data request packet, the controller process logic 174 can retrieve the requested data from the protocol memory 178 and generate a response packet. The communication logic 212 can receive the response packet from the controller process logic 174 (step 804). After receiving the response packet, the communication logic 212 can extract the requested data from the response packet and store the data from the response packet (using the stored address) along with a timestamp in the shadow memory 214 (step 806) and the process ends.

In an embodiment, if the frequency of data request packets from the HMI 22 becomes low such that the shadow memory 214 has not been updated in a preselected amount of time (as reflected by the timestamps), the main submodule 210 can enter an "active mode." In the "active mode" the communication logic 212 can actively send requests for information from the protocol memory 178 to the controller process logic 174. Once the communication logic 212 has received sufficient information from the protocol memory 178 such that the shadow memory 214 more accurately reflects the current state of the physical system, the communication logic 212 can exit the "active mode."

In FIG. 9, the command process begins by the communication logic 212 sending information associated with the command packet to the prediction submodule 220 (step 902). The information sent to the prediction submodule 220 can include information relating to the state of the physical system from the shadow memory 214, information relating to the registers or coils in the protocol memory 178 that would be affected by the command packet and the command packet itself. The prediction submodule 220 can then predict what the command packet would do if it were to change the value of a given register or coil in the protocol memory 178.

The modified controller process logic 224 of the prediction submodule 220 can then perform one iteration using the command packet and the information relating to the state of the physical system from the shadow memory 214 (i.e., the modified controller process logic 224 executes one time) (step 904). The output of the modified controller process logic 224 and the corresponding information from the shadow memory 214 is then provided to the physical system model 222 (step 906). The physical system model 222 is then used to determine new states for the physical system based on the output from the modified controller process logic 224 and the information about the physical system from the shadow memory 214 (step 908).

Next, the prediction submodule 220 determines if more iterations are needed for an accurate prediction (step 910). While the prediction submodule 220 can be used to perform a single iteration to predict the immediate response to a command packet, the prediction submodule 220 is used to perform a preselected number of iterations in order to predict the effect of the command packet on the physical system at a predetermined time in the future. The number of iterations performed by the prediction submodule 220 can be correlated to a time in the future since the scan cycle of an iteration of the controller process logic 174 is known. In some embodiments, the number of iterations performed by the prediction submodule 220 can vary based on the type of command packet received. If additional iterations are needed, then the new states determined by the physical system model 222 are provided to the modified controller process logic 224 (step 912) and the process returns to step 904. This process can then be repeated until the appropriate number of iterations has been completed.

Once the appropriate number of iterations has been completed, the new states of the physical system are provided to the communication logic 212 and the communication logic 212 of the main submodule 210 evaluates the new state with respect to the safety specification 216 (step 914). In an embodiment, corresponding registers from the physical system model 222 representing critical variables of the physical system are checked against values in the safety specification 216 that indicate the minimum or maximum values allowed for "safe" operation. If the critical variables become below the minimum value or above the maximum value, a safety violation is indicated. Furthermore, a similar check is performed to determine if a safety violation defined above occurs within a period of time defined in the specification to indicate whether imminent danger is present.

Figure 10:
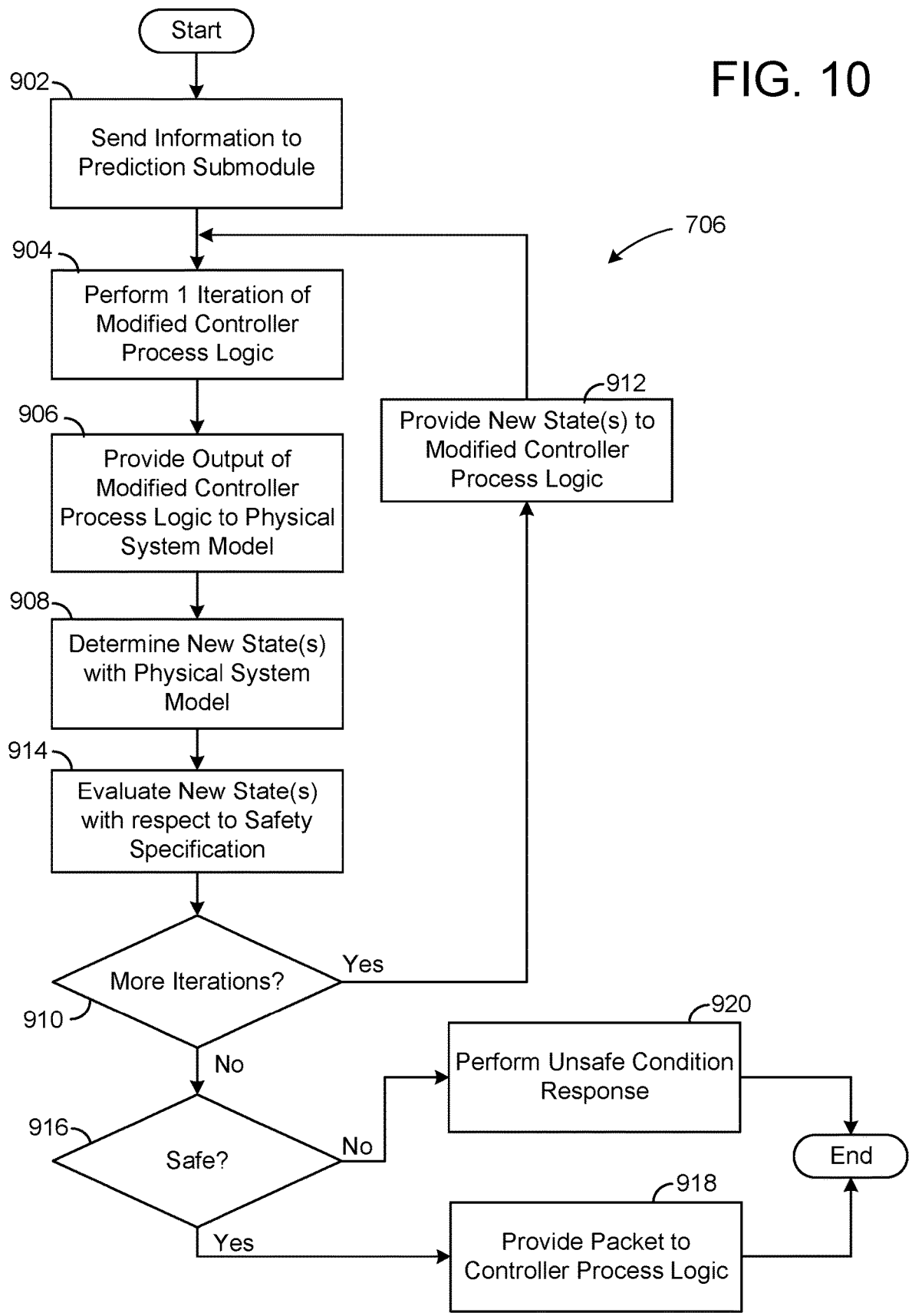

The communication logic 212 then uses the evaluation of the new states of the physical system to determine whether the received command packet would result in safe conditions for the physical system (step 916). In an alternate embodiment, the evaluation of the new states of the physical system can be evaluated with respect to the safety specification 216 at each interval as shown in FIG. 10, instead of at the completion of all of the intervals. If the received command packet is considered "safe," then the communication logic 212 forwards the command packet to the controller process logic 174 for subsequent execution (step 918). However, if the received command packet is considered "unsafe," then the communication logic 212 performs an unsafe condition response (step 920), which could include the dropping of the command packet.

In other embodiments, the controller 30 may receive a controller process logic upload from the HMI 22 (or other trusted node). The intrusion prevention system 160 can process the controller process logic upload in a similar manner to the way a command packet is processed. However, in step 904, the controller process logic upload is iterated instead of the modified controller process logic 224. In other words, when a controller process logic upload is received, the controller process logic upload is substituted for the modified controller process logic 224 in the prediction submodule 220.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. An industrial controller for an industrial control system, the industrial controller comprising:
   a processor;
   a memory device connected to the processor, the memory device including process logic configured to control and monitor a physical system connected to the industrial controller;
   a communication interface configured to permit communications with a node of the industrial control system; and
   an intrusion prevention system connected to the communication interface and the processor, the intrusion prevention system comprising:
      a first submodule, the first submodule including communication logic configured to receive and evaluate a packet received at the communication interface from the node and to determine whether the packet includes a command for execution by the process logic that, when executed by the process logic, changes one or more settings in the process logic;
      a second submodule connected to the first submodule to receive the command for the process logic from the first submodule, the second submodule including a model of the physical system, wherein the second submodule is configured to predict a future state of the physical system by simulating execution of the command with the model of the physical system; and
      the communication logic is configured to evaluate the predicted future state of the physical system from the second submodule to determine whether the future state is indicative of a safety violation and to control whether the process logic is permitted to execute the command based on evaluation of the future state by the communication logic, wherein the communication logic is configured to prevent execution of the command by the process logic if the future state is indicative of the safety violation.

2. The industrial controller of claim 1, wherein the second submodule includes a modified version of the process logic, and the second submodule is configured to determine the future state of the physical system using the modified version of the process logic with the command for the process logic as an input and the model of the physical system.

3. The industrial controller of claim 1, wherein the first submodule further includes a shadow memory that stores information about settings of the process logic and a current state of the physical system, wherein the first submodule provides the information about the settings of the process logic and the current state of the physical system from the shadow memory to the second submodule, and wherein the second submodule is configured to determine the future state of the physical system using the settings of the process logic and the current state of the physical system from the shadow memory.

4. The industrial controller of claim 1, wherein the first submodule includes a safety specification having a plurality of parameters related to states of the physical system, wherein the communication logic is configured to evaluate the predicted future state of the physical system with respect to corresponding parameters in the safety specification to determine whether the predicted future state is indicative of the safety violation.

5. The industrial controller of claim 1, wherein the second submodule includes a modified version of the process logic, and the second submodule is configured to receive information about settings of the process logic and a current state of the physical system from the first submodule and to use the received information about the settings of the process logic and the current state of the physical system to determine the future state of the physical system with the model of the physical system and the modified version of the process logic.

6. An industrial controller for an industrial control system, the industrial controller comprising:
   a processor;
   a memory device connected to the processor, the memory device including process logic configured to control and monitor a physical system connected to the industrial controller;
   a communication interface configured to permit communications with a node of the industrial control system; and
   an intrusion prevention system connected to the communication interface and the processor, the intrusion prevention system comprising:
      a first submodule, the first submodule including communication logic configured to receive and evaluate a packet received at the communication interface from the node and to determine whether the packet includes a command for the process logic that changes one or more settings in the process logic; and
      a second submodule connected to the first submodule to receive the command for the process logic from the first submodule, the second submodule including a model of the physical system, wherein the second submodule is configured to predict a future state of the physical system using the model of the physical system and the command for the process logic,
   wherein the communication logic is configured to evaluate the predicted future state of the physical system from the second submodule to determine whether a safety violation has occurred and to process the received packet based on the evaluation,
   wherein the modified version of the process logic is configured to perform an iteration with the command for the process logic as an input and to provide an output from the iteration to the model of the physical system; and
   wherein the model of the physical system is configured to generate the future state of the physical system based on the output from the iteration of the modified version of the process logic.

7. The industrial controller of claim 6, wherein the second submodule is configured to provide the generated future state of the physical system from the model of the physical system to the modified version of the process logic and to repeat the performing of iterations by the modified version of the process logic and the generating of future states of the physical system by the model of the physical system for a preselected time period.

8. The industrial controller of claim 1, wherein the communication logic is configured to provide the received packet to the process logic if the predicted future state does not indicate the safety violation and to prevent the received packet from being received by the process logic if the predicted future state indicates the safety violation.

9. The industrial controller of claim 1, wherein the communication logic is configured to provide the received packet to the process logic if the received packet does not include a command that changes one or more settings in the process logic.

10. The industrial controller of claim 9, wherein the communication logic is further configured to:
   receive a response packet sent by the process logic in reply to the received packet;
   extract information regarding a current state of the physical system from the response packet; and
   store the extracted information regarding the current state of the physical system in a shadow memory of the first submodule.

11. A method of detecting an attack on a controller of an industrial control system, the method comprising:
   receiving, by the controller, a packet from a node of an industrial control system, wherein the received packet is to be acted upon by process logic of the controller and the process logic being configured to control and monitor a physical system connected to the controller;
   determining, by an intrusion prevention system, whether the received packet includes a command that changes one or more settings in the process logic;
   simulating, by the intrusion prevention system, execution of the command with a model of the physical system;
   predicting, by the intrusion prevention system, a future state of the physical system based on the simulating;
   evaluating, by the intrusion prevention system, the predicted future state of the physical system to determine whether the predicted future state indicates a safety violation; and
   controlling, by the intrusion prevention system, whether the process logic is permitted to execute the command based on the evaluating, wherein the controlling comprises preventing execution of the command by the process logic if the future state is indicative of the safety violation.

12. The method of claim 11, wherein the controlling comprises providing the received packet to the process logic if the predicted future state does not indicate the safety violation.

13. The method of claim 11, wherein the controlling comprises preventing the received packet from being received by the process logic if the predicted future state indicates the safety violation.

14. The method of claim 11, wherein the simulating includes using modified process logic stored by the intrusion prevention system with the model of the physical system, wherein the modified process logic receives the command from the received packet.

15. The method of claim 14, further comprising providing information about settings of the process logic and a current state of the physical system stored in a shadow memory of the intrusion prevention system to the modified process logic and the model of the physical system.

16. A method of detecting an attack on a controller of an industrial control system, the method comprising:
   receiving, by the controller, a packet from a node of an industrial control system, wherein the received packet is to be acted upon by process logic of the controller and the process logic being configured to control and monitor a physical system connected to the controller;
   determining, by an intrusion prevention system, whether the received packet includes a command that changes one or more settings in the process logic;
   predicting, by the intrusion prevention system, a future state of the physical system using a model of the physical system in response to a determination that the received packet includes a command that changes the one or more settings in the process logic;
   evaluating, by the intrusion prevention system, the predicted future state of the physical system to determine whether the predicted future state results in a safety violation; and
   processing, by the intrusion prevention system, the received packet based on the evaluating,
   wherein the predicting the future state of the physical system includes:
   performing an iteration of the modified process logic;
   providing an output from the iteration of the modified process logic to the model of the physical system; and
   generating the future state of the physical system with the model of the physical system based on the output from the iteration of the modified process logic.

17. The method of claim 16, wherein the predicting the future state of the physical system further includes:
   providing the generated future state of the physical system to the modified process logic; and
   repeating the steps of performing the iteration, providing the output and generating the future state.

18. The method of claim 11, wherein the evaluating the predicted future state of the physical system includes evaluating the predicted future state of the physical system with respect to corresponding parameters in a safety specification stored by the intrusion prevention system.

19. The method of claim 11, further comprising providing, by the intrusion prevention system, the received packet to the process logic if the received packet does not include a command that changes one or more settings in the process logic.

20. The method of claim 19, further comprising:
   receiving, by the intrusion prevention system, a response sent by the process logic in reply to the received packet; and
   extracting, by the intrusion prevention system, information regarding a current state of the physical system from the response; and
   storing, by the intrusion prevention system, the extracted information regarding the current state of the physical system.

* * * * *